Jan. 28, 1936.  A. A. HORTON ET AL  2,028,747
ELECTRICALLY OPERATED PAPER CARRIAGE
Filed July 12, 1929  14 Sheets-Sheet 2

INVENTORS
Allen A. Horton
Dwight P. Rowland
by Rector, Hibben, Davis, & Macauley
ATTORNEYS Jan. 28, 1936.  A. A. HORTON ET AL  2,028,747
ELECTRICALLY OPERATED PAPER CARRIAGE
Filed July 12, 1929  14 Sheets-Sheet 6

INVENTORS
Allen A. Horton
Dwight P. Rowland

Rector, Hibben, Davis & Macauley
ATTORNEYS

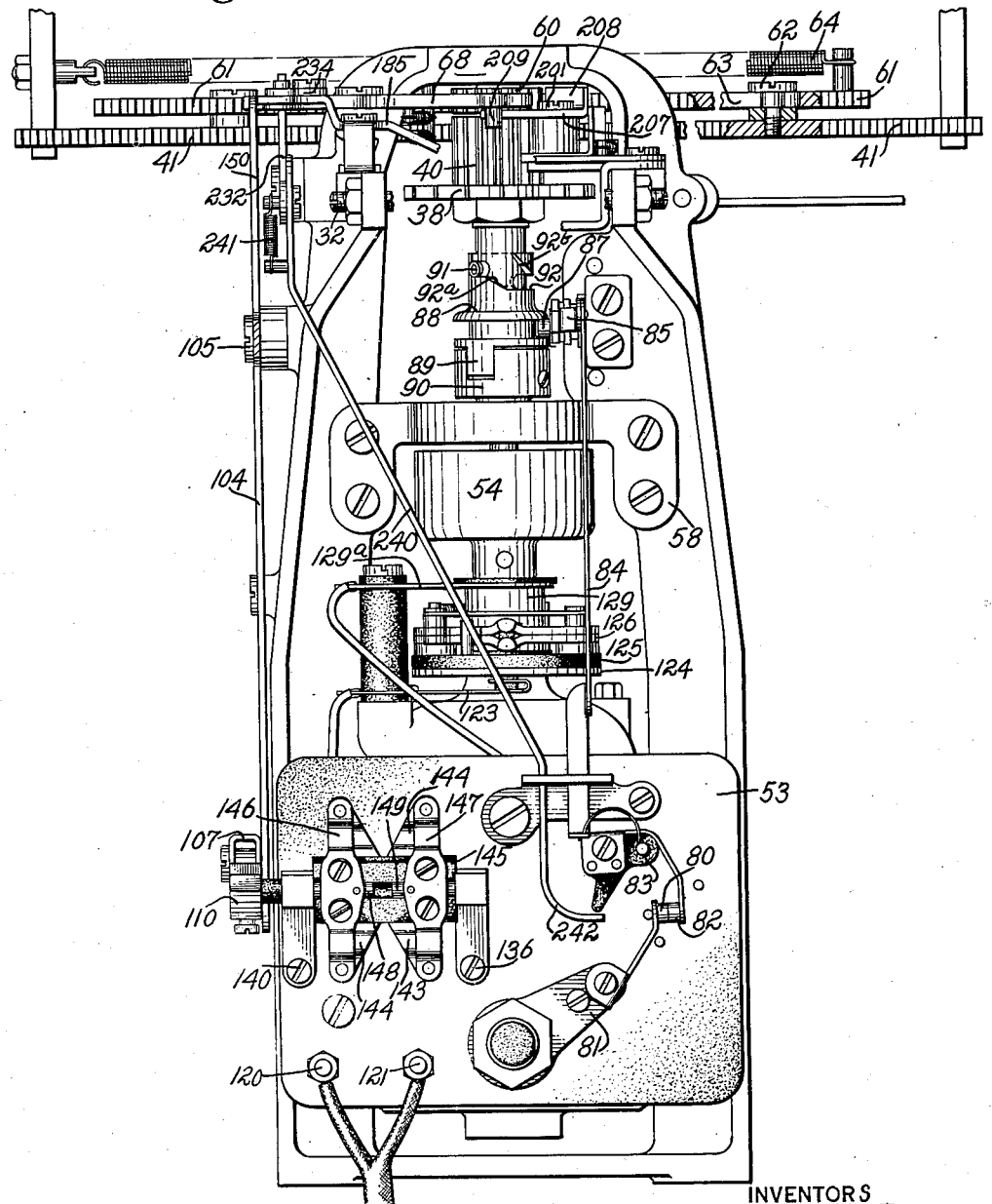

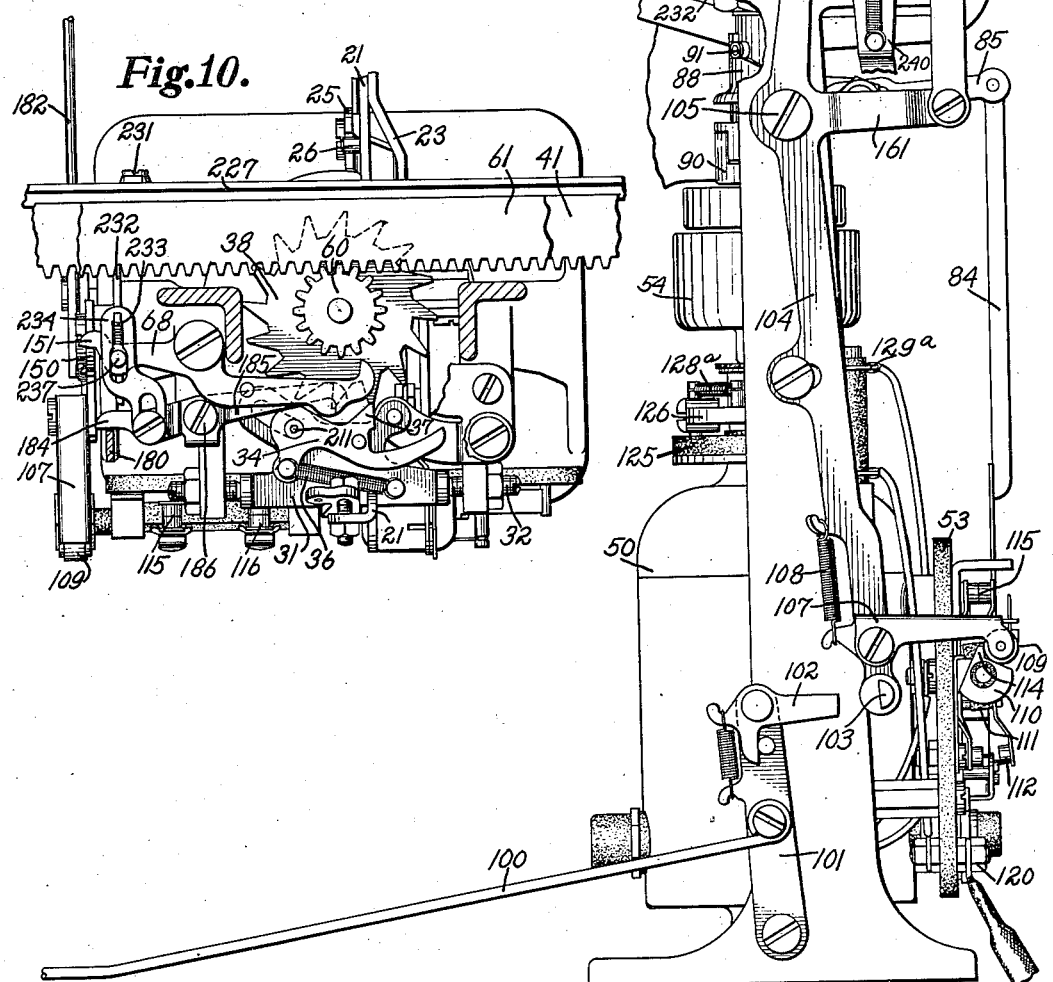

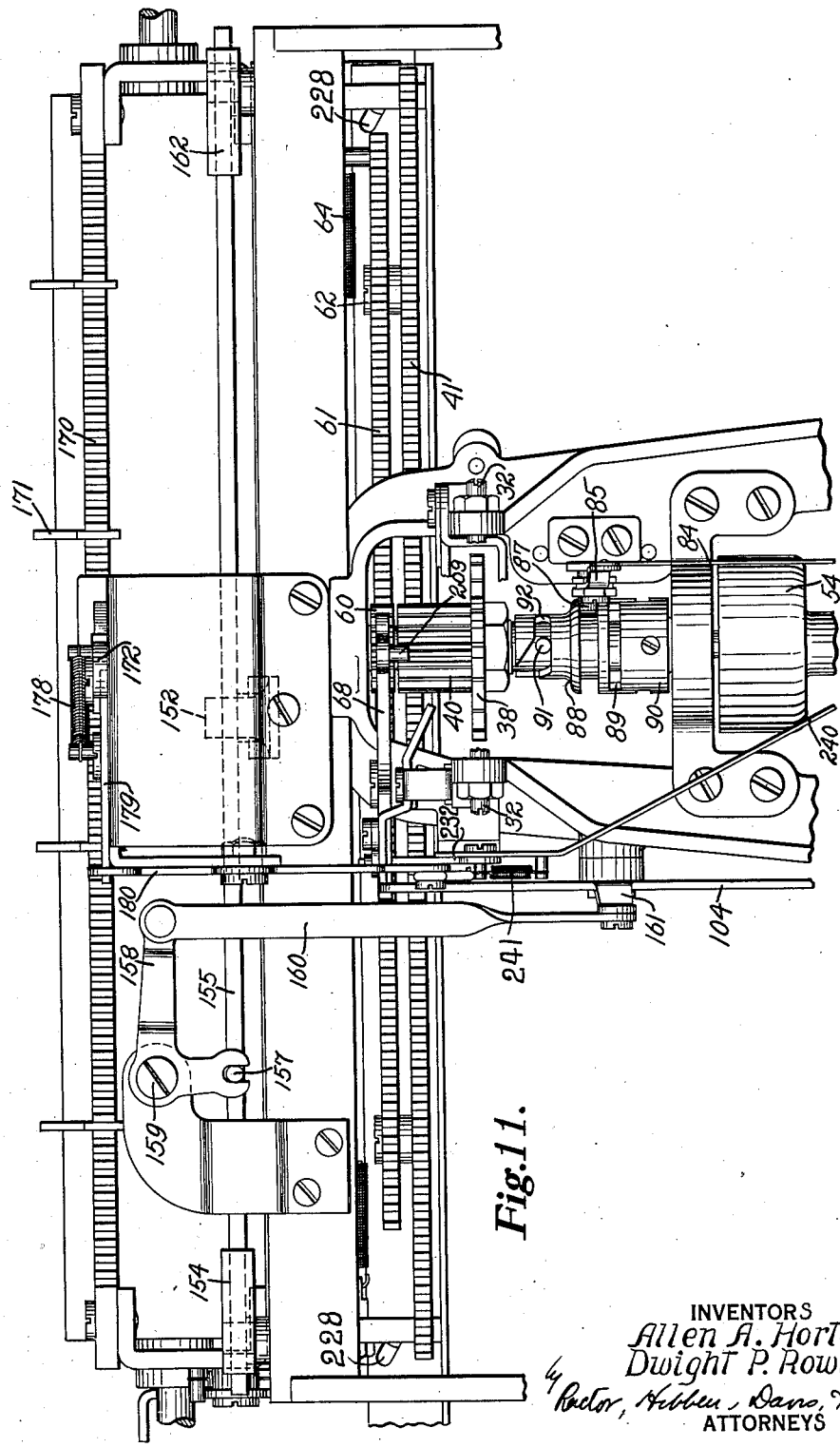

Jan. 28, 1936.  A. A. HORTON ET AL  2,028,747
ELECTRICALLY OPERATED PAPER CARRIAGE
Filed July 12, 1929  14 Sheets-Sheet 10
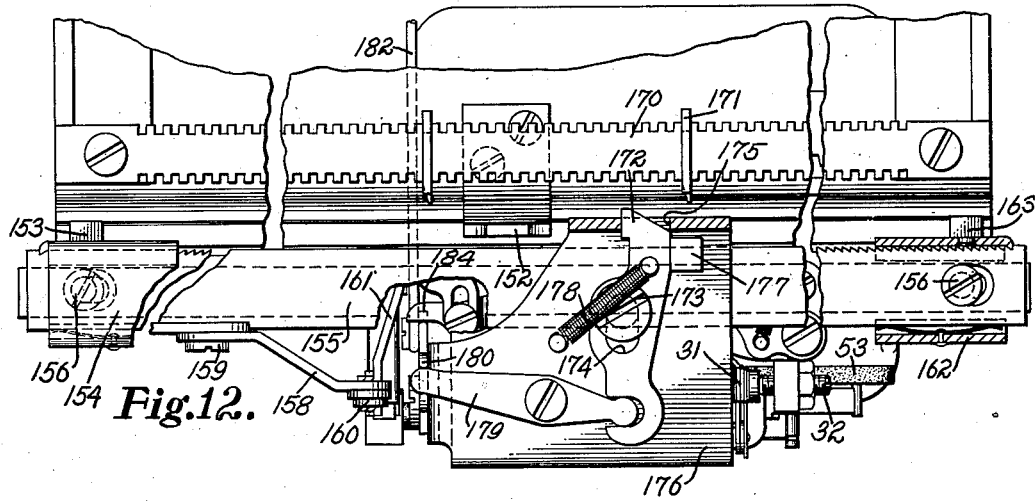
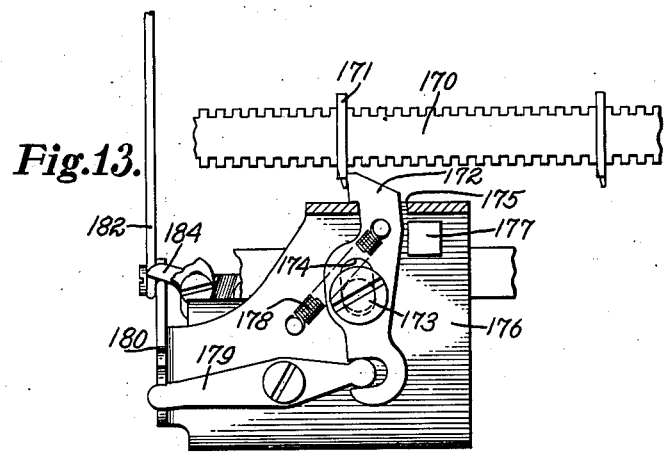
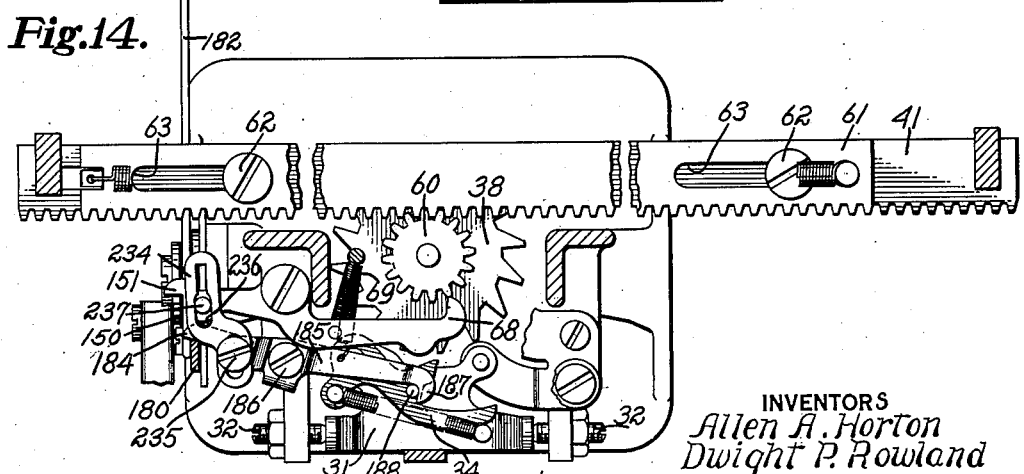
INVENTORS
Allen A. Horton
Dwight P. Rowland
by Rector, Hibben, Davis, & Macauley
ATTORNEYS Jan. 28, 1936.  A. A. HORTON ET AL  2,028,747
ELECTRICALLY OPERATED PAPER CARRIAGE
Filed July 12, 1929    14 Sheets-Sheet 11

INVENTORS
Allen A. Horton
Dwight P. Rowland
by Rector, Hibben, Davis, & Macauley
ATTORNEYS Jan. 28, 1936.　　A. A. HORTON ET AL　　2,028,747
ELECTRICALLY OPERATED PAPER CARRIAGE
Filed July 12, 1929　　14 Sheets-Sheet 12
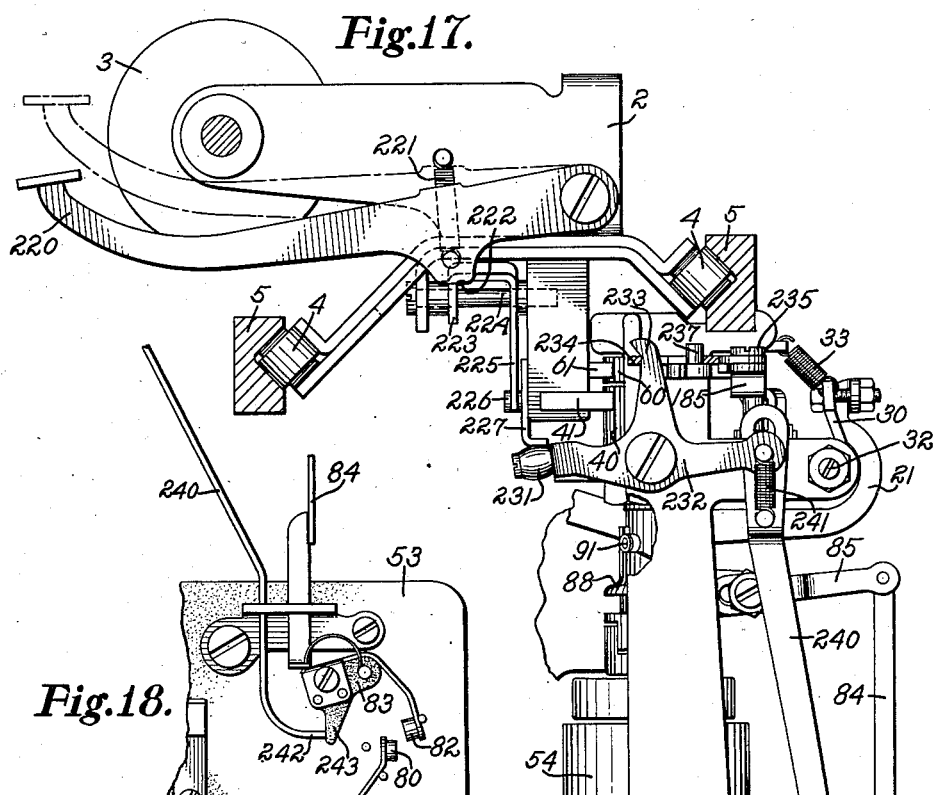
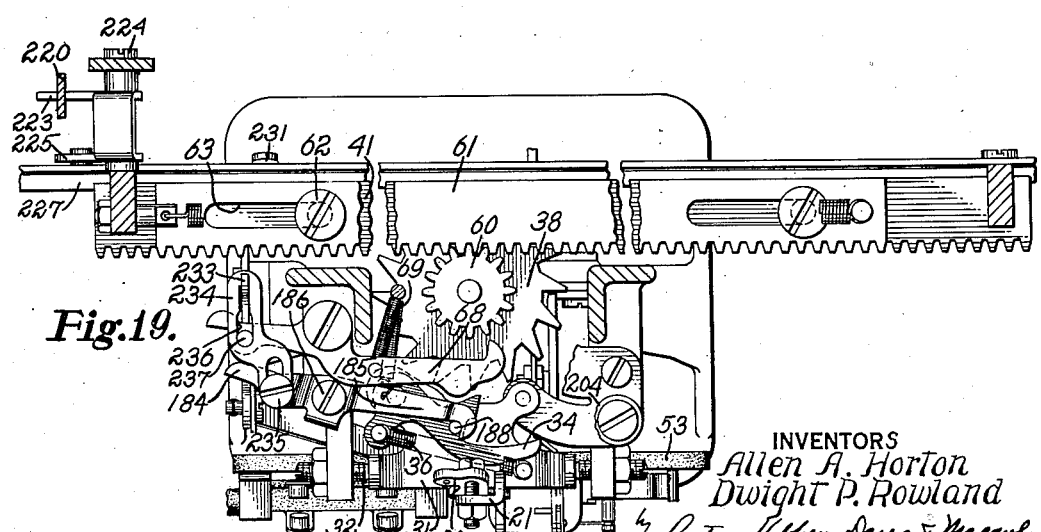
INVENTORS
Allen A. Horton
Dwight P. Rowland
ATTORNEYS

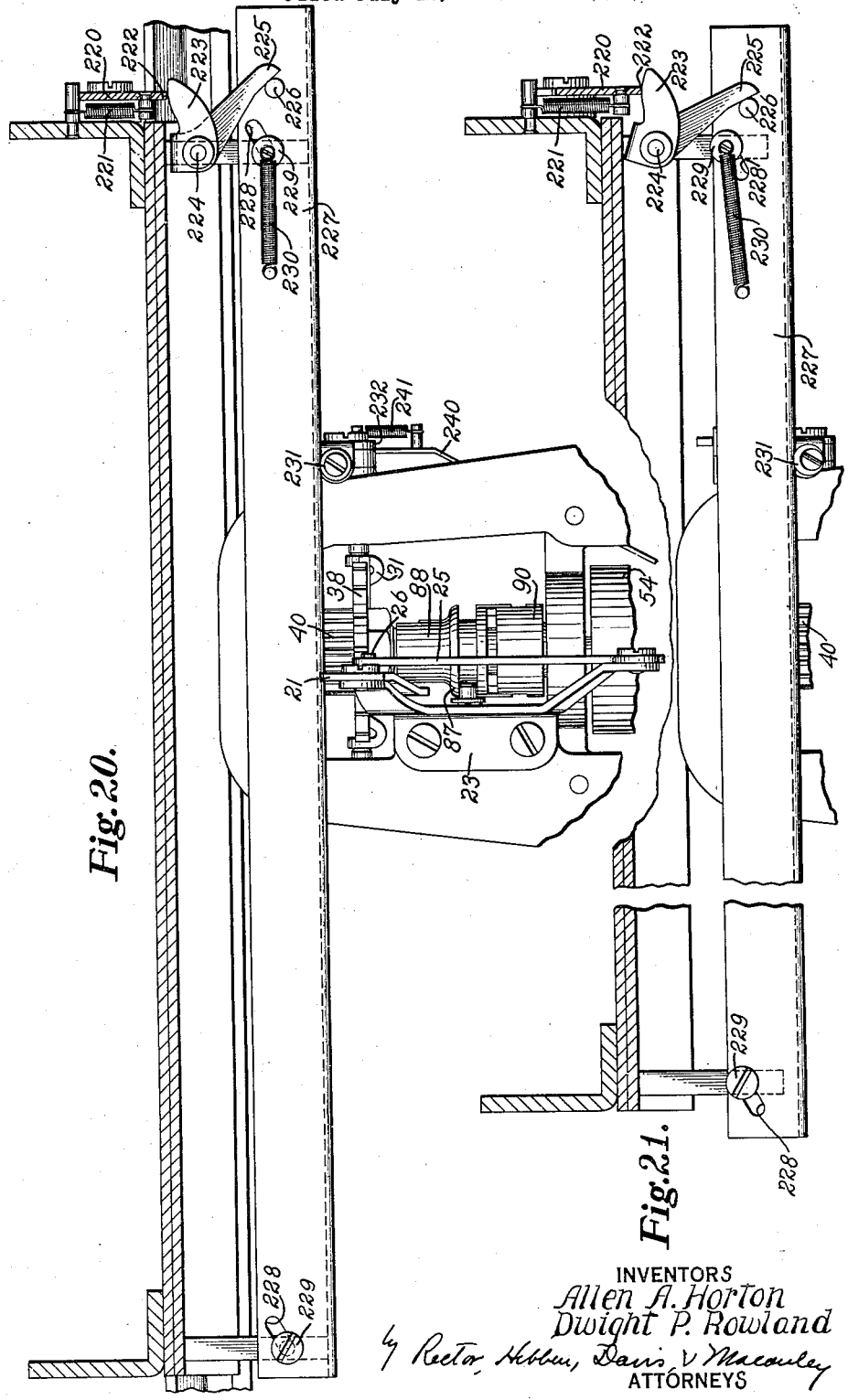

Jan. 28, 1936.  A. A. HORTON ET AL  2,028,747
ELECTRICALLY OPERATED PAPER CARRIAGE
Filed July 12, 1929    14 Sheets-Sheet 14
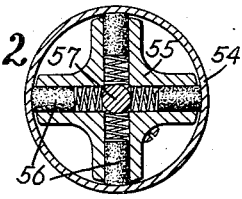
Fig.22.
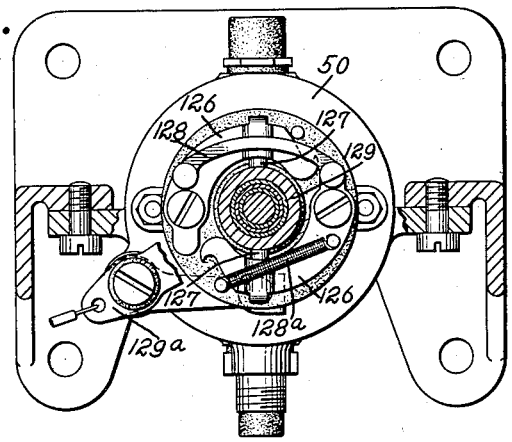
Fig.23.
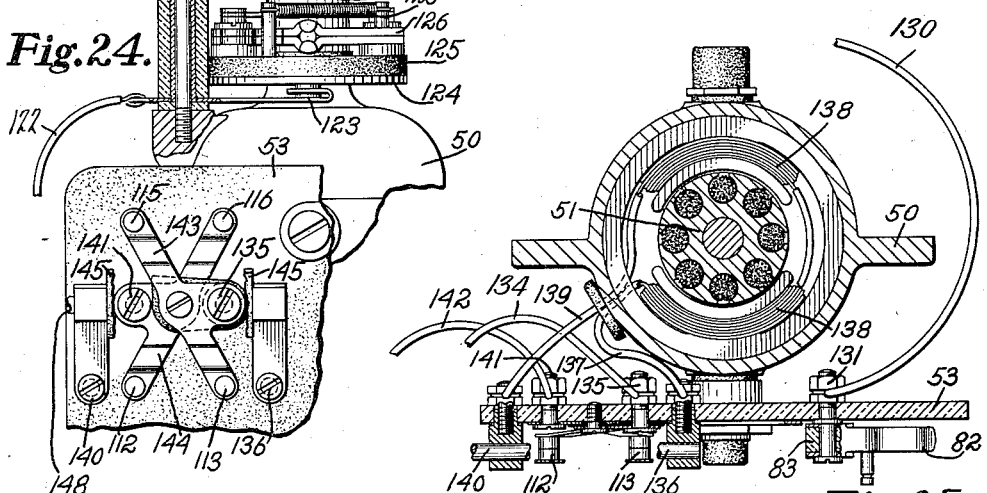
Fig.24.
Fig.25.
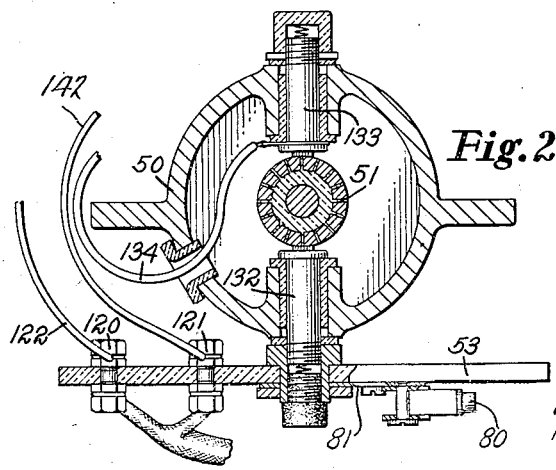
Fig.26.
INVENTORS
Allen A. Horton
Dwight P. Rowland
ATTORNEYS Patented Jan. 28, 1936

2,028,747

UNITED STATES PATENT OFFICE 2,028,747

ELECTRICALLY OPERATED PAPER CARRIAGE

Allen A. Horton, Plymouth, and Dwight P. Rowland, Detroit, Mich., assignors to Burroughs Adding Machine Company, Detroit, Mich., a corporation of Michigan Application July 12, 1929, Serial No. 377,680

34 Claims. (Cl. 197—82)

This invention relates to an electrically operated paper carriage of the type that is mounted to move back and forth across machines such as calculating machines, typewriters, and the like.

Carriages of this type are usually propelled in one direction by a spring and returned in the opposite direction by hand or a motor. One of the difficulties encountered with springs is that it is hard to obtain a uniform movement of the carriage owing to the fact that when the carriage is at one side of the machine where the spring is under its greatest tension, it is moved rapidly and suddenly whereas, when the carriage is near the end of its movement to the opposite side of the machine, it is moved more slowly and sluggishly.

One of the objects of the present invention is to provide an improved means for moving a carriage across a machine which will act with a substantially uniform force no matter what the position of the carriage.

The invention comprehends the use of an electric motor for accomplishing this result and this motor is also used to return the carriage across the machine. This calls for a reverse movement which necessarily introduces complications particularly where provision must be made for tabulating, back spacing, manual control when desired and return of the carriage from any position. However, the present invention has accomplished these results successfully.

Accordingly, another object of the invention is to provide a machine in which the paper carriage is moved to and fro across the machine in both directions by an electric motor.

Other objects are to provide a machine in which the paper carriage is not only operated in both directions by an electric motor but is also arranged so that it may be returned from any of its positions; so that it may be tabulated when desired; so that it may be back spaced at will; and so that it may be operated by hand when required.

Other objects and advantages of the invention will appear from the following specification and drawings.

An embodiment of the invention is shown in the accompanying drawings in which;

Fig. 8 is a partial rear elevation showing the parts in the position they occupy when the switch that controls the motor is closed;

Fig. 9 is a partial rear side elevation illustrating the carriage return and the tabulating controls;

Fig. 10 is a partial plan view showing the escapement parts in the position they occupy when the carriage is being returned;

Fig. 11 is a detail partial rear elevation showing particularly the driving and tabulating racks;

Fig. 12 is a partial plan view illustrating the tabulating mechanism, the parts being shown in normal non-tabulating condition;

Fig. 13 is a partial plan view similar to Fig. 12 with the parts in the position they occupy just before the carriage has been stopped in one of its tabulated positions;

Fig. 14 is a partial sectional plan view illustrating the condition of the escapement mechanism during tabulation of the carriage;

Fig. 17 is a partial side elevation and section of the means for optionally positioning the carriage by hand;

Fig. 18 is a partial rear elevation illustrating the switch for controlling the motor, the switch being in the position it occupies when blocked against operation;

Fig. 19 is a partial plan view illustrating the escapement mechanism and the carriage controls in the position they occupy when the carriage is released for manual operation;

Fig. 20 is a partial elevation and section showing the connections for releasing the carriage for manual control, the parts being shown in normal position, the view being taken looking from the front of the machine toward the rear;

Fig. 21 is a view similar to Fig. 20 with the parts in the position they occupy when operated to release the carriage for manual control.

Fig. 22 is a section on the line 22—22 of Fig. 2 through the slip clutch between the motor and the carriage;

Fig. 23 is a sectional plan view on the line 23—23 of Fig. 2 illustrating the governor that is employed for controlling the speed of the motor;

Fig. 24 is a partial rear elevation illustrating the reversing switch for the motor;

Fig. 25 is a partial section through the motor and the switchboard on the line 25—25 of Fig. 3;

Fig. 26 is another partial section through the motor and switchboard on the line 26—26 of Fig. 3.

Figure 7:
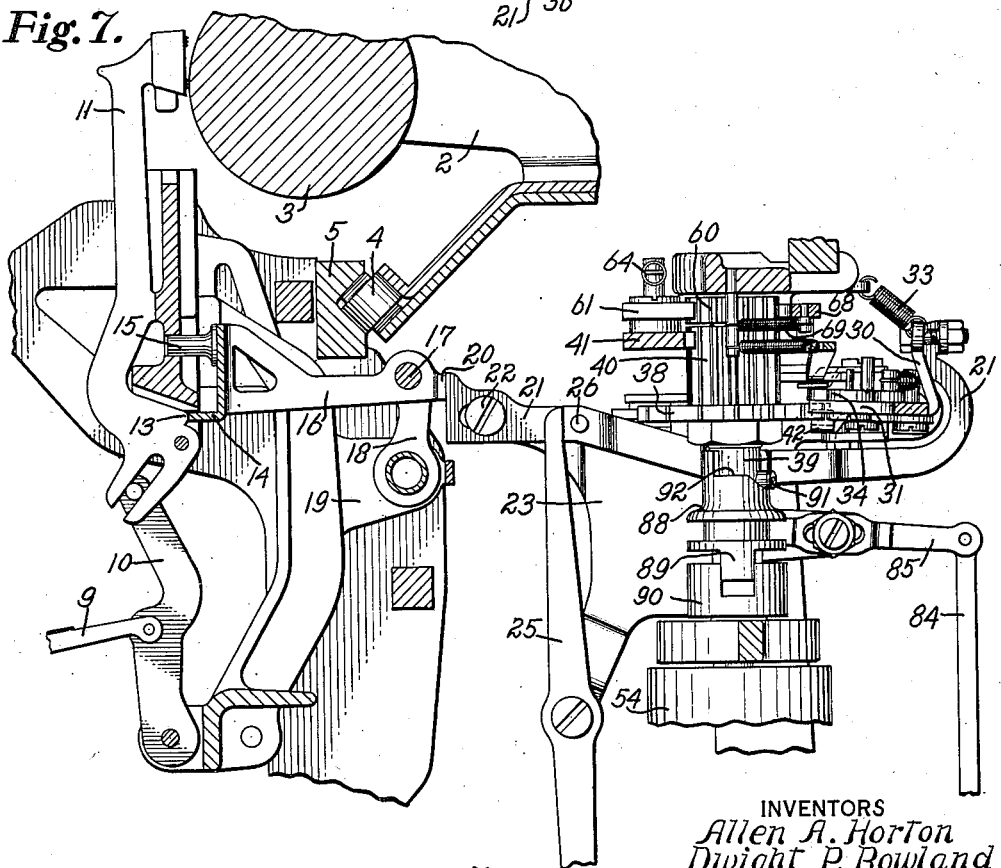
Fig. 7 is an enlarged partial side elevation and section illustrating how the type bars release the escapement mechanism.

The invention is shown applied to a machine having a frame 1, across which travels a paper carriage 2 carrying a platen 3, the carriage being provided with suitable antifriction rollers 4 traveling in raceways 5 on the frame. Type keys 6 are provided which, when depressed, rock their respective levers 7 counterclockwise thereby swinging a second lever 8 counterclockwise, the latter acting through a link 9 to swing a third lever 10 counterclockwise to throw the type bar 11 from the position of Fig. 2 to the printing position of Fig. 7. After operation the type bars are returned to normal by springs 12.

Each of these type bars 11 has a shoulder 13 (Fig. 2) adapted to engage a lateral flange on a universal bail 14 which extends around the type basket in position to be engaged by any one of the type bars that is thrown to printing position. This universal bail is guided at its forward end by studs 15 operating in openings in the frame 1 and it is provided with an arm 16 pivoted on a shaft 17 carried by an arm 18 journaled on brackets 19 of the frame. The rear end of the arm 16 has a lateral lug 20 engaging the end of a link 21 slidable on a stud 22 carried by the frame member 23, the link 21 extending to the rear of the machine and being connected to the escapement mechanism as will be later described.

The link 21 can also be moved rearwardly by the spacing bar S (Fig. 1) which, when depressed, pulls a link 24 forward, the link being connected at its rear end to a pivoted lever 25 whose upper end is positioned to engage a stud 26 on the link 21.

From the above description it will be clear that, whenever one of the type bars is thrown to printing position or when the spacing bar is depressed, the link 21 will be moved rearward. This will operate the escapement mechanism.

*Escapement mechanism*

The carriage is provided with an escapement mechanism controlled by the type keys and the spacing bar so that the carriage may be released at each depression of a type key and of the spacing bar.

Figure 2:
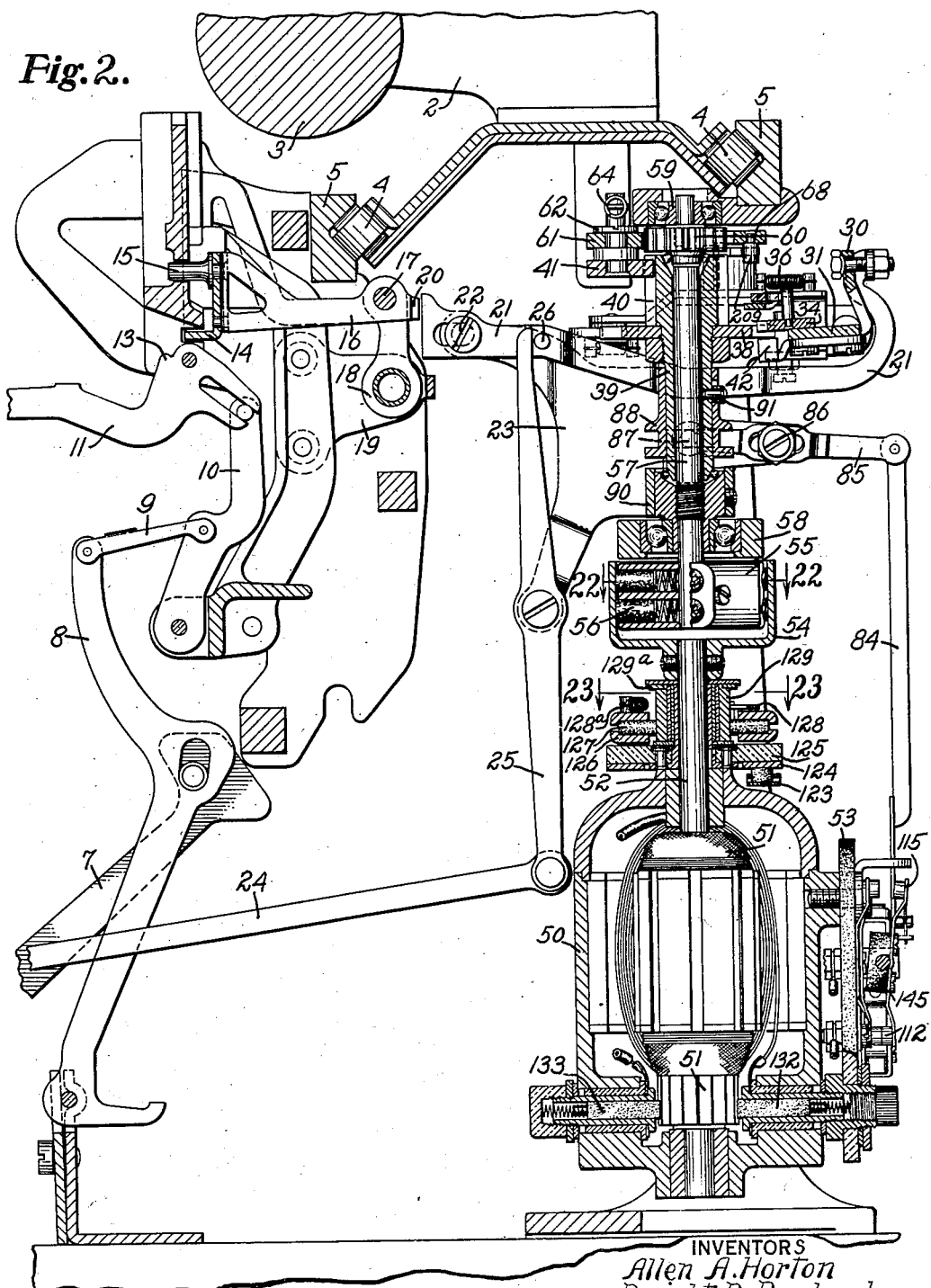
Fig. 2 is an enlarged partial section of the rear of the machine showing particularly the electric motor drive and its connections.
Figure 3:
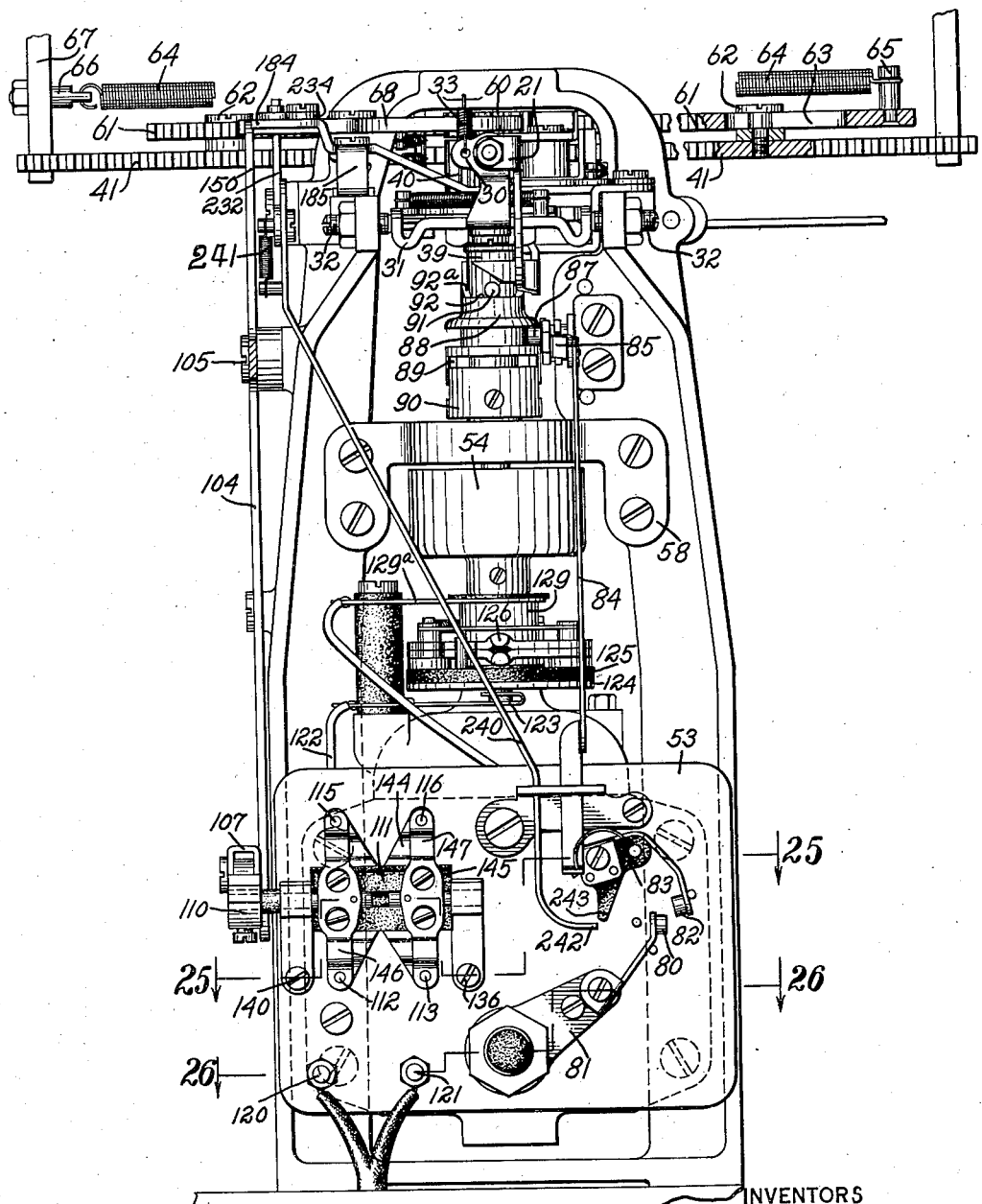
Fig. 3 is a partial rear elevation with the parts in the position they occupy when the motor is not running.

Referring to Fig. 2 it will be observed that the rear end of link 21 is curved upwardly and connected to the upper end 30 of an escapement plate 31 which is pivoted on a horizontal axis as illustrated in Fig. 3, the plate 31 having its side edges bent upwardly and provided with suitable openings for receiving the adjustable pivot pins 32. The escapement plate 31 is urged in a counter-clockwise direction by a spring 33 (Fig. 7), the arrangement being such that the plate normally occupies the position of Fig. 2 but when the link 21 is moved rearwardly the plate 31 is rocked, clockwise against the tension of its spring to the position of Fig. 7.

Figure 6:
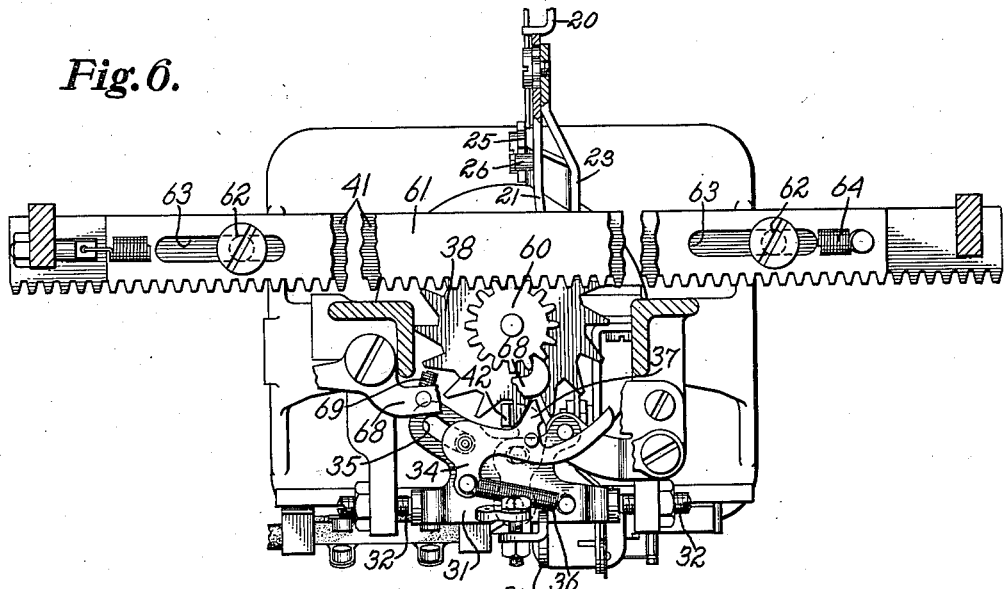
Fig. 6 is a partial plan view similar to Fig. 4 showing the parts in the position they occupy with a type key depressed, some of the parts being omitted to show others more clearly.

The plate 31 has an escapement pawl 34 slidably pivoted to it (Fig. 6) the pivot being in a slot 35 in plate 31. The pawl is urged counter-clockwise as viewed in Fig. 6 by a spring 36. This pawl has a nose 37 adapted to prevent clockwise rotation of an escapement ratchet 38 which is fixed to a sleeve 39 (Fig. 2) having a pinion 40 on its upper end meshing with a rack 41 rigidly fixed to the paper carriage.

Figure 4:
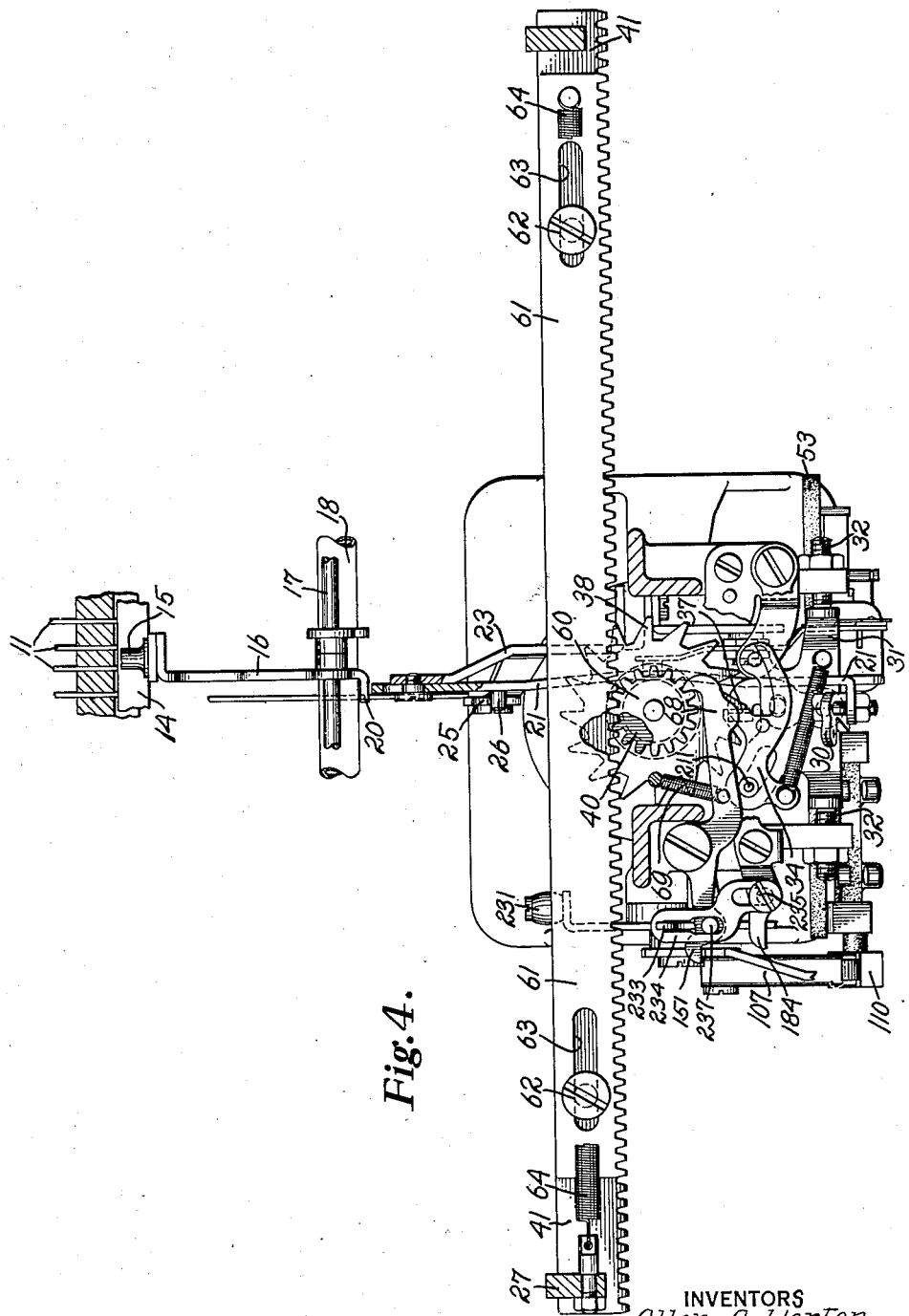
Fig. 4 is a partial plan view showing portions of the escapement mechanism and of the driving racks for the carriage the parts being in normal condition.

Assuming that the paper carriage is urged to the right, as viewed from the rear (Fig. 4) which is the position in which the carriage will be viewed throughout the specification, it will be evident that the escapement ratchet 38 will tend to rotate clockwise but such clockwise movement is prevented by the engagement of one of the teeth of the ratchet with the nose 37 of the pawl 34. The tension on the carriage urges the pawl to the left and holds the pivot in the left hand end of the slot 35 as illustrated in Fig. 4. When the link 21 is moved rearward by depression of a type key or the spacing bar, or by any other means, the escapement plate 31 is rocked upwardly to its Fig. 7 position which moves the escapement pawl 34 above the plane of the ratchet 38 thereby releasing the ratchet. The carriage tends to move to the right but this movement is limited by a lug 42 (Fig. 6) on the plate 31 which moves upwardly with the plate and into position to engage one of the teeth of the ratchet 38. When the escapement pawl 34 is moved above the plane of the ratchet 38, as above explained, the spring 36 immediately moves the pawl from the position of Fig. 4 to that of Fig. 6, that is, the pawl is moved to the right in the slot 35. This positions the pawl so that when it is moved downwardly again into the plane of the ratchet its nose 37 will be in position to engage the next tooth of the ratchet and is so timed that it will engage the next tooth just before the lug 42 leaves its holding tooth.

In other words, when the link 21 is moved rearwardly the pawl 34 is moved up so as to release the ratchet disk 38. This releases the ratchet and permits it to move slightly until arrested by the lug 42 on the escapement member 31. The pawl 34 then moves to the right. When pressure on the type key or spacing bar is released, the spring 33 rocks the escapement plate 31 back to normal which causes lug 42 to release the carriage and moves the escapement pawl 34 into the plane of the ratchet disk 38 the nose 37 of the pawl being then in a position to engage the next tooth of the ratchet to arrest the carriage after it has moved one step.

While this form of escapement mechanism has been found suitable for use with the present invention, any other suitable form could also be used.

*Motor drive*

Figure 1:
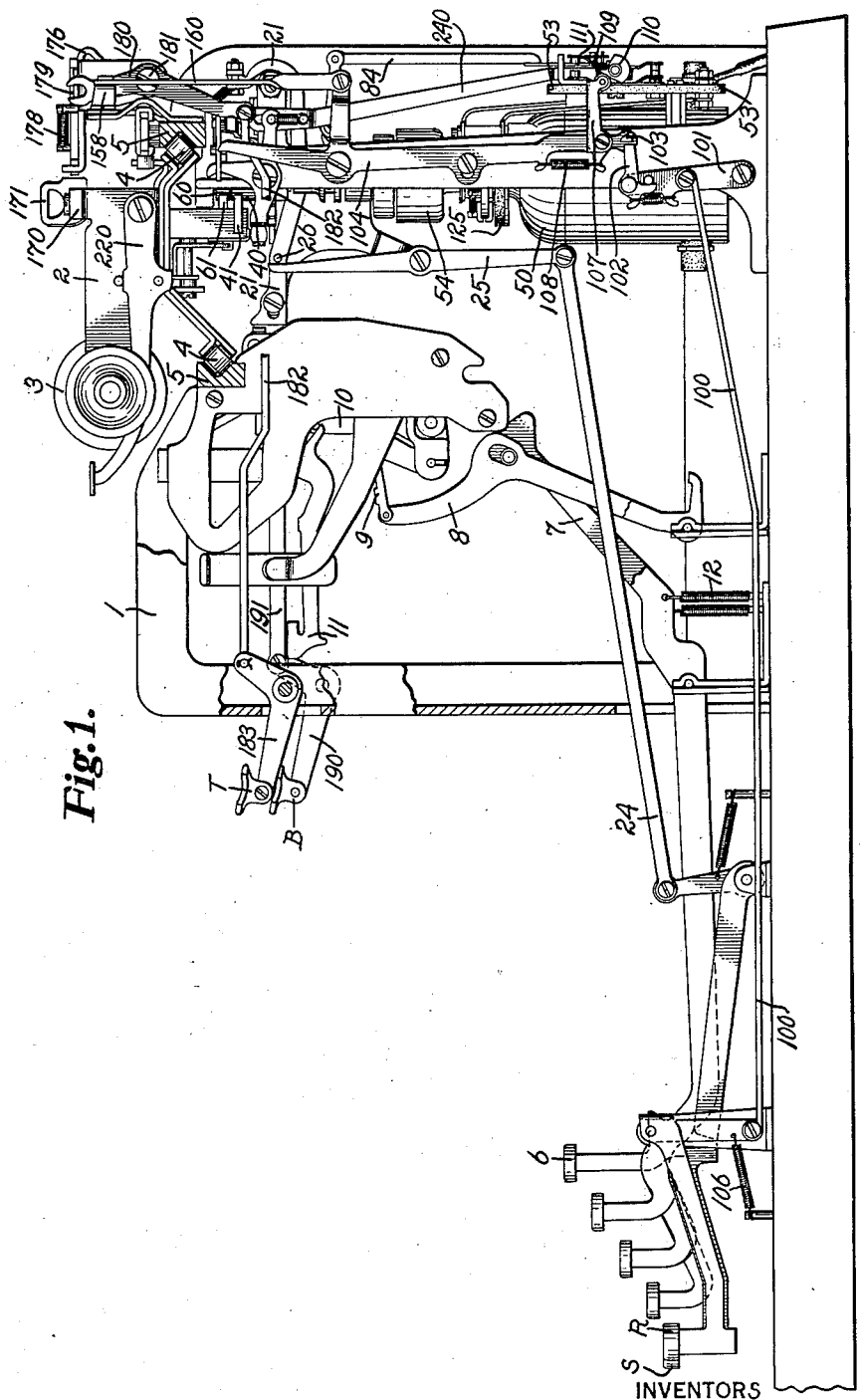
Fig. 1 is a sectional side elevation of a machine with the invention applied thereto.

The carriage is driven in both directions by an electric motor which is mounted vertically as illustrated in Figs. 1 and 2. The motor is contained within a housing 50 and it has an armature 51 directly connected to a shaft 52. On the rear of the motor housing is mounted a switchboard 53 of insulating material which carries controlling switches, the construction and operation of which will be later described.

In order to prevent damage to the mechanism in the event it should become blocked in some way, the carriage is driven through a slip clutch illustrated in Figs. 2 and 22. The upper end of the shaft 52 is connected to a cup like member 54 inside of which is positioned a spider 55 (Fig. 22) carrying a plurality of small friction blocks 56 which are spring pressed outwardly to engage the interior surface of the cup 54. The spider 55 is fixed to a shaft 57 journaled at its lower end in a ball bearing 58 and at its upper end to a second ball bearing 59, both bearings being carried by portions of the machine frame. Should the mechanism become blocked in any way, the cup 54 will slip on the friction blocks 56.

Figure 5:
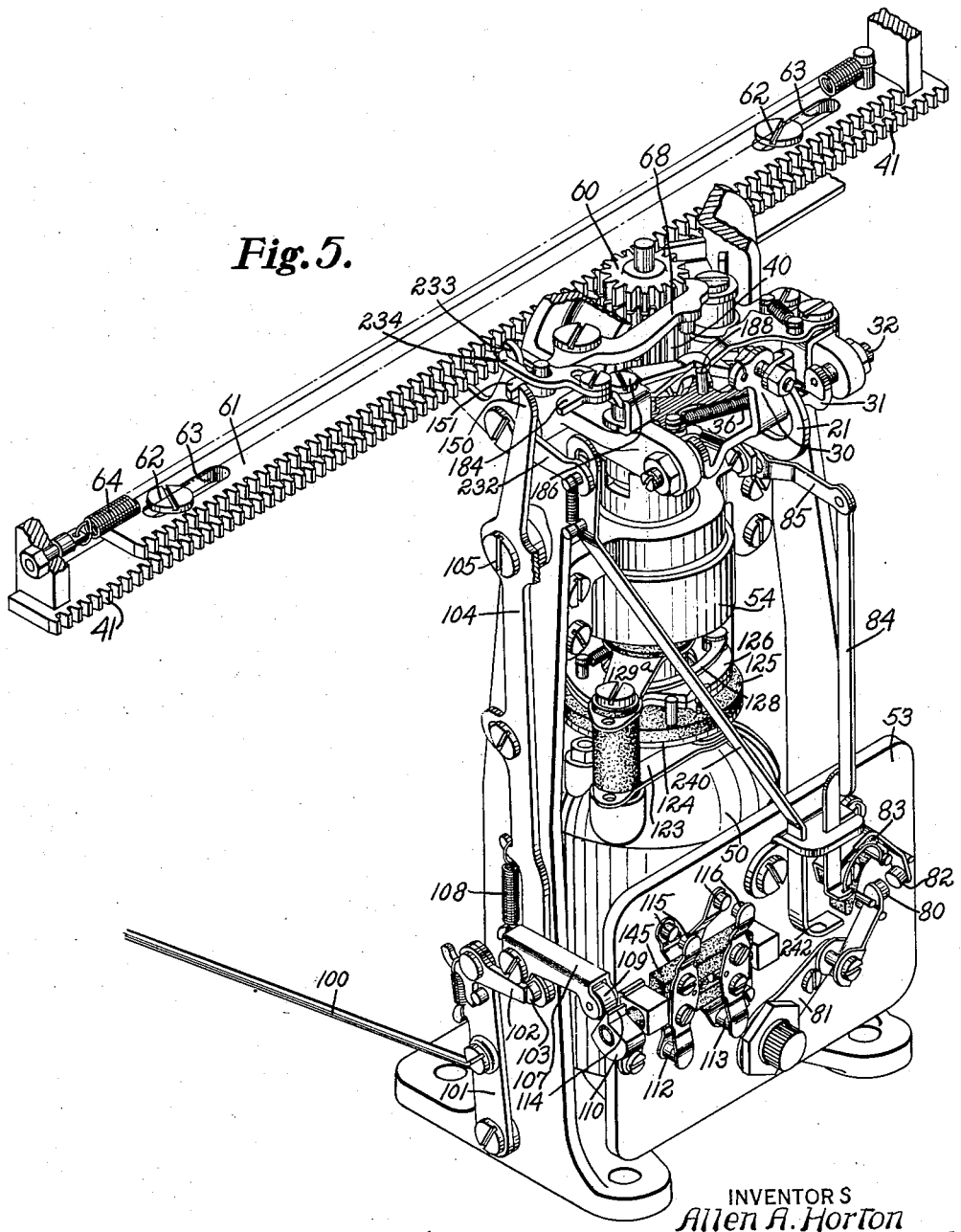
Fig. 5 is a partial rear perspective of the electric drive.

Fixed to the upper end of the shaft 57 is a pinion 60 meshing with a second or auxiliary rack 61 on the carriage. This rack is mounted on the rack 41 for movement relative to the carriage. For this purpose the rack 41 has headed studs 62 fixed to it which project through slots 63 in the rack 61, the construction being clear by reference to Figs. 3 and 5. Connecting the racks is a long spring 64 the right hand end of which (Fig. 3) is connected to a stud 65 on the auxiliary rack 61 and the left hand end of which is connected to a stud 66 on one of the side members 67 of the carriage to which the rack 41 is fixed. This spring is constantly under tension tending to move the rack 41 to the right and the rack 61 to the left in Fig. 3.

The rack 61 is normally prevented from moving to the left by a pawl 68 (Fig. 4) which is urged counter-clockwise by a spring 69 which urges the hooked end of pawl 68 into engagement with the teeth of the pinion 60. This pawl prevents counter-clockwise movement of the pinion 60 thereby preventing the rack 61 from moving to the left, but its nose is shaped so as not to interfere with clockwise rotation of the pinion thereby allowing the rack 61 to move freely to the right.

Movement of the rack 41 to the right, as viewed in Fig. 3, is normally prevented by the escapement mechanism heretofore described.

It will be clear that, normally, both racks are latched against movement and that when one is released while the other is held the released rack will move under the influence of spring 64, the rack 41 when released moving to the right and the rack 61 when released, moving to the left.

The electric motor is normally inactive and hence there is no continuously running motor producing the undesirable hum that often accompanies a machine that is operated by a continuously moving shaft or motor. The motor circuit is opened and closed by means of a switch illustrated in its normal position in Fig. 3 on the switchboard 53. This switch includes a spring mounted contact point 80 connected to one terminal 81 of the motor circuit and adapted to be engaged by a second spring mounted contact point 82 carried by a pivoted lever 83 to which contacts constitute a switch in the motor circuit. When the lever 83 is rocked clockwise to the position of Fig. 8 the motor circuit is closed and the motor rotates to move the driving connections clockwise as viewed in Figs. 4 and 8, thereby moving the rack 61 to the right.

The switch is controlled by the relative positions of the racks 41 and 61. The connections include a link 84 (Fig. 3), the upper end of which is connected to one end of an arm 85 (Fig. 2) pivoted to a stationary pivot 86 and having a stud 87 (Fig. 3) on its opposite end engaging in an annular slot in a collar 88 slidably and rotatably mounted on the sleeve 39. This collar has a downwardly projecting lug 89 (Figs. 7 and 8) engaging in a slot in a second collar 90 which is fixed to the shaft 57, the connection being one that causes the collar 88 to rotate with the shaft 57, but allows said collar to move longitudinally. The collar is moved longitudinally by means of a stud 91 (Fig. 2) carried by the sleeve 39, the stud being positioned in a cam slot 92 in the collar 88. The operation of these parts in controlling of the motor circuit is as follows:

As the rack 41 moves to the right with the carriage under tension of spring 64 it moves the pinion 40 clockwise (Fig. 5) and this, in turn, moves the sleeve 39 and the stud 91 clockwise. The movement continues until the stud 91 reaches the raised portion 92a of the cam slot 92 whereupon the stud acts to cam the collar 88 downward. The downward movement of the collar 88 pulls the link 84 upward and closes the switch 80—82 whereupon the motor starts to rotate to drive the shafts 52 and 57 clockwise. As the shaft 57 moves clockwise the collar 88 is moved with it through the connections 90—89 (Fig. 8) and this moves the cam slot 92 over the pin 91 whereupon the collar 88 is moved upwardly again and the link 84 moved downward to open the switch 80—82 thereby stopping the motor. The collar 88 is moved upwardly and the link 84 downwardly by gravity which can be assisted by a spring located in any suitable position if necessary.

The movement of the motor under the above conditions rotates pinion 60 to move the rack 61 to the right relative to the rack 41 to re-tension the spring 64, the motor being automatically started and stopped at about every four or five steps of the carriage. During the movement of the rack 61 by the motor the rack 41 is held against movement by the escapement mechanism, the rack 61 being free to move to the right because the pawl 68 is shaped to allow freedom of movement in this direction.

It will be appreciated that, in this manner, the spring tension tending to move the carriage to the right can be maintained practically uniform through the automatic intermittent movement of the motor. The spring 64 is quite long and its tension is approximately the same over the four or five steps that the carriage is moved by the spring before the motor operates to move the rack 61 to the right to re-tension it. After the carriage has moved four or five steps the motor automatically re-tensions the spring, the action taking place automatically and intermittently as the carriage moves across the machine.

*Return of carriage by carriage return key*

After the paper carriage has traveled to the right to the end of its movement, it is necessary to return it which requires a reverse movement of the rack 41. This reverse movement is affected by the motor through connections operating as follows:

Referring to Fig. 1 the machine is provided with a return key R which, when depressed, thrusts a link 100 rearward. The rear end of this link is connected to a pivoted arm 101 (Fig. 5) carrying a pass-by pawl 102 on its upper end. This pass-by pawl is positioned to engage a stud 103 (Figs. 5 and 9) carried by the lower end of a lever 104 which is pivoted at 105 and urged clockwise by a spring 106 (Fig. 1) which urges the return key to normal. Pivoted on the lower end of lever 104 is an arm 107 urged clockwise by a spring 108. The rear end of this arm carries a roller 109 adapted to engage a cam 110 on a motor reversing switch 111 (Fig. 3). This reversing switch normally occupies the position illustrated in Fig. 5 where the two lower movable contacts 112 and 113 are in engagement with their stationary contacts. In this position of the switch, the motor is connected so as to rotate to move the carriage to the right (Fig. 5) as heretofore explained.

When the return key is depressed and the link 100 thrust rearwardly the end of the pass-by pawl 102 engages the stud 103 and swings the lever 104 counter-clockwise. As this occurs the roller 109 on the arm 107 rides over the projection 114 on the upper side of the cam 110, the arm 107 rocking counter-clockwise slightly against the tension of its spring 108. As the roller passes over the projection 114 on the cam 110 the spring 108 acts to snap the cam 110 counter-clockwise thereby rocking the reversing switch 111 from the position of Fig. 5 to that of Fig. 9 so that the upper contacts 115 and 116 (Fig. 5) are in engagement. This reverses the motor connections so as to cause the motor to rotate in a direction to move the carriage to the left as viewed in Fig. 5.

The connections for the motor are shown in detail in Figs. 3, 24, 25 and 26. Referring to Fig. 3, it will be noted that the two wires from the power circuit are connected to the terminals 120 and 121. Starting with the terminal 120 (Fig. 26), the circuit passes through the conductor 122 to the spring contact 123 of the automatic governor shown in Figs. 2, 23 and 24.

The automatic governor includes the spring contact 123 resiliently engaging a conductor ring 124 on a plate 125 of insulating material that rotates with the motor shaft 52 (Fig. 2). This plate has two arms 126 pivoted to it (Fig. 23) which are in electrical engagement with the ring 124, and they carry contact brushes 127. The arms are connected together by a link 128 and are urged by a spring 128ª in directions to cause the brushes 127 to engage a stationary circular contact 129 in electrical contact with a terminal 129ª (Fig. 24). It will be understood that the arms 126 are adjusted so that when the speed of the motor exceeds a predetermined amount, the motor circuit will be opened until the motor dies down to the desired speed whereupon the circuit will be again closed, the action being automatic and serving to keep the motor at a constant speed.

Continuing the motor circuit from the terminal 129ª, it passes through conductor 130 to the terminal 131 (Fig. 25) of the switch contact 82. Assuming that the switch is closed, contact 82 engages contact 80 (Fig. 26) and the circuit continues to the motor brush 132, through the motor armature 51, to the second brush 133 and through the conductor 134 to the terminal 135 (Fig. 25).

In the normal position of the reversing switch 111, the circuit is from the terminal 135 to terminal 136, through conductor 137, field coils 138, conductor 139, terminal 140, terminal 141 and conductor 142 to terminal 121 which is the other side of the line.

In the reversed position of the switch which is the position for returning the paper carriage, the circuit through the field coils is reversed, that is, it is from terminal 135 to terminal 140, conductor 139, field coils 138 in reverse direction, conductor 137, terminal 136, terminal 141 and conductor 142 to terminal 121.

The reversal of the circuit is accomplished by the switch 111 in the following manner:

Referring to Fig. 24, the terminal 135 is connected by a strip 143 with the contacts 113 and 115 while the terminal 141 is connected by a strip 144 with the terminals 112 and 116. The cam 110 (Fig. 5) is mechanically connected to but electrically insulated from a shaft carrying an insulating block 145. Mounted on this block are two spring strips 146 and 147 (Fig. 8) of conducting material. The strip 146 is in electrical engagement with a pivot pin 148 that in turn is electrically connected to terminal 140. The strip 147 is in electrical engagement with a pivot pin 149 that is electrically connected to terminal 136. When the switch is in normal position with the lower ends of strips 146, 147 engaging the contacts 112 and 113 as in Figs. 2 and 5, the connection is 135, 143, 113, 147, 136 to the field coils and 140, 148, 112, 144 to terminal 141. When the switch is in the position of Fig. 9 with the upper ends of strips 146, 147 in engagement with contacts 115, 116 the circuit is 135, 143, 115, 146, 140, 139 to the field coils, 137, 136, 147, 116, 144, to 141.

When the carriage return key is depressed, it is not only necessary to reverse the motor connections but the motor must be started and the carriage must be freed for its return movement.

The carriage is freed and the motor circuit closed in one operation. The lever 104 has a nose 150 (Fig. 5) that engages the tail 151 of the pawl 68 that latches the pinion 60. As the lever 104 is rocked counter-clockwise by depression of the return key the nose 150 engages the tail 151 of latch 68 and swings it to the position of Fig. 10. This frees the pinion 60 for counter-clockwise movement and the spring 64 immediately moves rack 61 to the left (Fig. 5) which puts the racks 61 and 41 in the same relative position as if rack 41 had caught up with 61 in the travel of the carriage across the machine, with the result that the stud 91 cams the collar 88 down and closes switch 80—82, the closing taking place slightly after the reversal of the motor field connections. The escapement mechanism does not interfere with the return of the carriage owing to the fact that the teeth on the ratchet 38 are shaped so that the pawl 34 will ride over them when the ratchet is moved counter-clockwise.

Assuming that the motor field has been reversed and the motor circuit closed, the motor rotates the pinion 60 counter-clockwise which moves rack 61 to the left. This rack was already at its extreme left position relative to rack 41 when the motor started hence the action of the motor on rack 61 results in carrying rack 41 and the carriage to the left. This movement continues without interruption until the carriage is returned to its left-hand position because as long as the motor urges the rack 61 to the left, it is maintained in its position for keeping the motor switch closed.

The carriage thus returns across the machine under the power of the motor until a stop 152 on it (Fig. 12) strikes a stud 153 on a sleeve 154 that is adjustably positioned on a bar 155 that is mounted for a limited sliding movement on studs 156. The bar 155 carries a stud 157 (Fig. 11) positioned in a slot in one arm of a bell crank lever 158 pivoted at 159. The other arm of this bell crank lever is connected to a link 160 that, in turn, is connected to an extension 161 of the lever 104.

When the carriage reaches its left-hand position, the stop 152 strikes stud 153 and moves the bar 155 to the left. This rocks the bell crank lever 158 clockwise and pushes down on link 160 thereby rocking lever 104 clockwise which throws the reversing switch back to its original position into engagement with contacts 112 and 113. This reverses the motor which thereupon rotates pinion 60 clockwise and moves rack 61 to the right, the carriage being held by the escapement mechanism against movement to the right. The rack moves to the right and tensions spring 64, the movement being only for a short distance because the stud 91 soon rides off of the high portion 92a of the cam slot 92 and collar 88 rises to open the motor switch to stop the motor.

In this manner, the carriage is stopped in its left-hand position and the parts are automatically placed in condition for again moving the carriage across the machine to the right.

As described so far, the conditioning of the mechanism for returning the carriage is accomplished by depressing a return key. It will be clear that this key may be depressed in any of the positions of the carriage and that the carriage will be automatically returned to its left-hand position. It is desirable however to also have provision made for automatically returning the carriage without depression of the return key.

Automatic carriage return

Automatic return of the carriage, without use of the return key R is effected by a sleeve 162 (Fig. 11) which is adjustably secured to the bar 155 (Fig. 12). As the carriage reaches the limit of its movement to the right, which may be varied by varying the position of sleeve 162 on bar 155, the stop 152 strikes a stud 163 on sleeve 162 (Fig. 12) and moves bar 155 to the right. This rocks the bell crank lever 158 in a direction to pull link 160 upward which rocks lever 104 counter-clockwise and results in reversing the motor connections. The lever 104 also releases the pawl 68 and the motor is started as previously described. In fact, the operation is the same as when the release key R is depressed, the parts being set into operation automatically by the carriage instead of by the release key.

With the construction just described, the operator need not pay any attention to the carriage. As the machine is operated, the carriage will travel across it in one direction under control of the escapement mechanism, the carriage movement being an easy steady movement that is the same at the finish as at the start. When the carriage reaches its right-hand position, it is automatically returned across the machine without any operation being necessary on the part of the operator, line spacing taking place automatically in any well-known manner.

Tabulating mechanism

It is sometimes desirable to tabulate the carriage to the right, as viewed from the rear, more than one of its ordinary steps. It is also desirable that the positions in which the carriage is stopped under such movement be capable of being varied so that the carriage can be tabulated to any one of a number of positions. For this purpose a tabulating mechanism is provided as follows:

Fixed to the paper carriage is a tabulating bar 170 (Fig. 12) having teeth on both of its edges for receiving tabulating stops 171 which may be positioned at any one of a large number of positions on the bar. These tabulating stops are normally inactive but they may be used to stop the carriage in any one of a number of columnar positions by projecting a tabulating dog 172 into the path of the stops. This dog 172 is pivoted on a stud 173, the dog having an elongated pivot slot 174 to enable it to have a longitudinal as well as a pivotal movement. The forward end of the dog has a limited swinging movement in an opening 175 in the frame plate 176, a stop 177 being provided to limit the clockwise swinging of the dog. The dog 172 is urged in a counter-clockwise direction by a spring 178 and it is moved longitudinally by means of a pivoted lever 179 one end of which engages in a slot in the dog 172 and the other end a slot in the upper end of a lever 180 (Fig. 1) pivoted at 181. The lower end of the lever 180 is connected by a link 182 with a pivoted bell crank lever 183 having a tabulating finger piece T on its outer end. When the finger piece T is depressed the link 182 is pulled forward which rocks the lever 180 clockwise and the latter, in turn, rocks the lever 179 counter-clockwise thereby thrusting the tabulating dog 172 into the path of the tabulating stops 171, the position of the dog 172 under such conditions being illustrated in Fig. 13.

In order that the carriage may tabulate to the right, it is necessary that the escapement mechanism be released and this is accomplished by the lever 180 which is pivoted so that its edge engages the tail 184 of a latch 185 (Fig. 14) pivoted at 186 and having a hooked end 187 adapted to engage a stud 188 on the escapement pawl 34. Accordingly, when the tabulating key is depressed, the dog 34 is swung clockwise out of engagement with the escapement ratchet 38 and is latched against forward movement. This releases the carriage for movement to the right.

When the carriage is released, it immediately moves slightly to the right under tension of spring 64 and the rack 41 moves with it thereby catching up with the rack 61. This causes the motor to be started in the manner heretofore described. Inasmuch as the carriage is free to continue to the right, the rack 61 never moves ahead of rack 41 and the motor continues to run until the carriage is arrested by the next tabulating stop after which the motor moves the rack 61 to limit of its movement to the right which results in an automatic opening of the motor circuit in the manner heretofore explained.

Any number of tabulating stops may be employed and these may be located as desired so that the carriage may be tabulated from one position to another by simply depressing the tabulating key.

It should be noted that the latch 185 not only holds the escapement pawl 34 out of engagement with the ratchet 38, but it also holds the pawl against movement to the right in the slot 35. This maintains the pawl in proper position to become effective immediately when the carriage has reached its tabulated position and without allowing the carriage to lose a space as it otherwise would.

Back spacing mechanism

When errors occur it is necessary to move the carriage back a certain number of spaces and for this purpose a back spacing mechanism is provided.

A back spacing key B is mounted on a bell crank lever 190 (Fig. 1) which is connected to a link 191 so that the link is moved forward when the back spacing key is depressed. The rear end of this link 191 is connected to one arm of a pivoted bell crank lever 192 (Fig. 15) whose other arm is connected to a link 193 carrying a dog 194 on its outer end, the dog being urged counter-clockwise by a spring 195 but being held against movement by a stop 196 on a portion of the typewriter frame.

Figure 15:
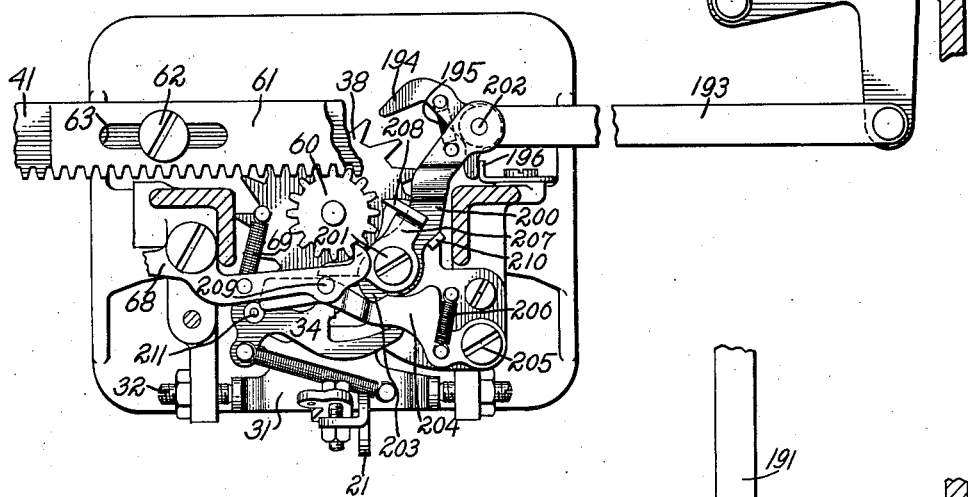
Fig. 15 is a partial plan view showing particularly the back spacing mechanism, the parts being illustrated in normal position.
Figure 16:
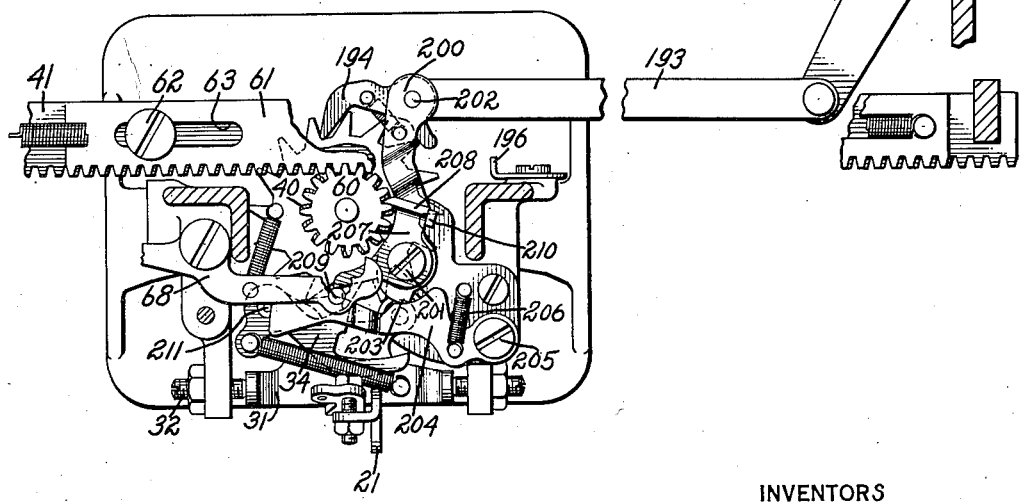
Fig. 16 is a partial plan view similar to Fig. 15 with the parts in the position they occupy while a back spacing is taking place.

When the back spacing key is depressed the link 193 is thrust to the left as viewed in Fig. 15 which frees the dog 194 of the stop 196 whereupon the spring 195 rocks the dog into engagement with the teeth of the escapement ratchet 38, as viewed in Fig. 16. Continued movement of the link 193 moves the ratchet 38 counter-clockwise, the parts being proportioned so that one depression of the back spacing key moves the ratchet 38 one step counter-clockwise to move the carriage back one step.

In order that the carriage may be moved back a step it is necessary to hold the escapement pawl 34 in position against movement to the right under the influence of the spring 64 acting on rack 41, and it is also necessary to release the pinion 60 in order that the rack 61 may move to the left. The later release might not always be necessary but should be provided for.

The above releases are accomplished by means of a lever 200 pivoted at 201. One end of the lever is connected at 202 to the link 193. The other end of the lever 200 has a cam shaped projection 203 on it adapted to engage the cam edge of an arm 204 pivoted at 205 and urged clockwise by a spring 206. Also pivoted on the stud 201 is a dog 207 having a nose 208 adapted to engage the teeth of the pinion 60. The other end of this dog is normally engaged by a downwardly extending stud 209 (Figs. 8 and 15) on the dog 68. The lever 200 has a lug 210 on one of its edges for engaging the edge of the dog 207 as will be presently described.

When the link 193 is moved to the left, as viewed in Fig. 15, by depression of the back spacing key, the lever 200 is rocked counter-clockwise which rocks the arm 204 counter-clockwise and positions the end of the arm in front of a stud 211 on the escapement dog 34 thereby blocking the dog against movement to the right while the escapement ratchet is being back spaced. Also, the counter-clockwise movement of the lever 200 causes the lug 210 to engage the dog 207 to rock it counter-clockwise. This causes the nose 208 of the dog to engage the teeth of pinion 60 after the release of pawl 68 to thereby limit the movement of pinion 60 so that the rack 61 moves back only one step.

By releasing the pinion 60 in the manner above described, the two racks 41 and 61 maintain the same relative position during back spacing thereby preventing the motor from being started.

When the back spacing key is released the parts move back to their normal positions shown in Fig. 15, after which the machine may be back spaced again or it may be moved across the machine in the usual manner by depression of the spacing bar or type keys.

Hand control

It is sometimes desirable to move the carriage by hand and, in order that this may be accomplished, connections are provided so that, when a lever is depressed, the carriage is freed of its motor drive, stop pawls, and escapement, to permit it to be moved freely in either direction by hand.

For this purpose a lever 220 is pivoted on the side of the carriage, said lever being urged upward by a spring 221 (Figs. 9, 20, 21). The lever 220 (Fig. 20) has a downwardly projecting portion 222 engaging one arm 223 of a bell crank lever or yoke pivoted to the carriage frame at 224, the other arm 225 of said bell crank being positioned to engage a stud 226 on a bail 227. This bail has two inclined slots 228 near its ends which engage over studs 229 on the carriage frame. The bail is urged to the right as viewed in Fig. 20 by a spring 230. When the lever 220 is depressed, the bell crank lever 223—225 (Fig. 20) is rocked clockwise which moves the bail 227 to the left as viewed in Fig. 20. This causes the bail to be cammed downwardly by studs 229 to the position of Fig. 21.

When the bail 227 moves downwardly it contacts a roller 231 (Fig. 17) on the end of a three-armed lever 232 (Fig. 17). The upper arm 233 of this lever engages in a slot in a slide plate 234 (Fig. 19) which is mounted by a pin and slot connection on a stud 235 on the latch 185 pivoted at 186. The slide plate 234 also has a slot 236 in it whose end is adapted to engage a stud 237 on the tail of dog 68.

When the three armed lever 232 is rocked counter-clockwise by depression of one of the levers 220, the plate 234 is pulled forward which, through the stud 237, rocks the dog 68 out of engagement with the pinion 60. At the same time, through the stud 235, the latch 185 is rocked clockwise and it engages the pin 188 on the escapement dog 34 to move the dog out of engagement with the escapement ratchet and hold it in position against movement to the right under the influence of its spring 36. This frees both of the racks 41 and 61 so that the carriage is free to move back and forth in both directions.

In order to prevent the motor from being started under these conditions, the third arm of the three armed lever 232 is connected to a link 240 (Fig. 17) through a spring 241. The lower end of this link has a bent end 242 (Figs. 3 and 13) which, when the link is raised to its Fig. 18 position, moves to the rear of a projection 243 on the movable switch member 83 to positively prevent the switch member from rocking clockwise in a direction to close the switch.

In other words, when one of the levers 220 is depressed, the carriage escapement mechanism is disabled, the pawl for holding the rack 61 is disabled, and the motor switch is blocked against closing so that the carriage is entirely free to be moved in either direction by hand and operation of the motor is prevented. As soon as pressure on the lever 220 is released it moves back to normal and the other parts that have been disabled return to normal under influence of their respective springs.

We claim:

1. In a machine of the class described, a paper carriage movable across the machine in one direction under the control of an escapement mechanism operable by keys and returnable across the machine in the opposite direction, an electric motor having driving connections for moving said carriage in both of said directions, a switch for controlling said motor, and manually manipulatable means which, when operated, disables said escapement mechanism and said driving connections and blocks said switch against being closed.

2. In a machine of the class described, a paper carriage movable in one direction across the machine under the control of an escapement mechanism operable by keys and returnable in the opposite direction, a motor having driving connections for moving said carriage in both directions, controlling devices including a switch for controlling said motor, and a back spacing mechanism which, when operated, disables said escapement mechanism and said driving connections, moves said carriage back one space and prevents said controlling devices from starting the motor.

3. In a machine of the class described, a paper carriage movable across the machine in letter spacing direction under the control of an escapement mechanism operable by keys, a spring for so moving said carriage, and means acting automatically after said carriage has moved a predetermined distance in letter spacing direction to retension said spring without moving said carriage.

4. In a machine of the class described, a movable paper carriage, a spring tending to move the carriage in letter spacing direction, an electric motor, and means operated by said motor and controlled by said carriage for automatically tensioning said spring during the movement of said carriage across the machine in letter spacing direction.

5. In a machine of the class described, a movable paper carriage, a spring tending to move said carriage in letter spacing direction under the control of an escapement mechanism operable by keys, and an electric motor under the control of said carriage having connections to said spring for automatically maintaining the effective force of said spring substantially constant as the carriage moves across the machine.

6. In a machine of the class described, a movable paper carriage, a spring tending to move said carriage under the control of an escapement mechanism operable by keys, an electric motor, and mechanism operated by the motor and controlled by the carriage for automatically and intermittently tensioning said spring as the carriage moves across the machine.

7. In a machine of the class described, a movable paper carriage, a spring tending to move said carriage under the control of an escapement mechanism operable by keys, an electric motor having connections to said spring for tensioning it, a switch for controlling the motor, and means controlled by the carriage for opening and closing the switch as the carriage moves across the machine to start and stop the motor to automatically and intermittently tension the spring.

8. In a machine of the class described, a movable paper carriage, a spring tending to move said carriage under the control of an escapement mechanism operable by keys, an electric motor, a member movable by said motor relative to the carriage and connected to said spring for tensioning the same, and means controlled by the relative position of said member and carriage for starting and stopping the motor to tension the spring.

9. In a machine of the class described, a movable paper carriage, a rack on said carriage under the control of an escapement mechanism, a second rack on the carriage movable relative to the first, an electric motor having driving connections with said second rack, a spring between said racks tending to move said carriage under the control of said escapement mechanism, and means controlled by said racks for starting and stopping the motor according to the positions of said racks relative to one another to thereby automatically tension said spring.

10. In a machine of the class described, a movable paper carriage, an escapement mechanism therefor, a member on said carriage mounted for movement relative to the carriage in one direction but normally held against movement in the other direction, a spring between said member and carriage tending to move said carriage in one direction under the control of said escapement mechanism, an electric motor having connections for moving said member, and means controlled by said movable member and carriage for automatically starting the motor when the carriage reaches the limit of its movement relative to said member under the action of said spring, said means also acting to stop the motor after the motor has moved said member to the limit of its movement relative to the carriage.

11. In a machine of the class described, a movable paper carriage, a spring tending to move said carriage in one direction across the machine under control of an escapement mechanism, an electric motor having driving connections for automatically maintaining the effective force of said spring substantially constant as the carriage moves across the machine, and means for reversing said motor, said motor driving connections acting, when said motor is reversed, to move said carriage in the opposite direction across said machine.

12. In a machine of the class described, a movable paper carriage, a member mounted on said carriage for movement relative to it but normally held against movement in one direction, a motor connected to said member to move the same relative to the carriage, a spring between said carriage and member tending to move the carriage in one direction across the machine under the control of an escapement mechanism, means controlled by said carriage and member and depending upon the relative positions thereof for starting and stopping the motor, and means for reversing the motor connections and releasing said member to permit the latter to move to a position to start the motor.

13. In a machine of the class described, a traveling paper carriage movable in one direction across the machine under the influence of a spring and under the control of an escapement mechanism, a motor having driving connections with a rack on said carriage which is movable relative to the carriage to tension said spring, a switch for the motor controlled by the relative positions of said rack and carriage, said positions being changed by movements of the carriage relative to the rack, and means for controlling the return of the carriage which when manipulated reverses the motor and releases said rack to permit it to move under the influence of the spring to a position to start the motor, whereby said carriage is returned across the machine by said motor.

14. In a machine of the class described, a movable paper carriage, a spring normally under tension and connected to move said carriage across the machine in one direction under the control of an escapement mechanism, means for releasing the tension of said spring and returning the carriage across the machine in the opposite direction, and means automatically retensioning said spring after the carriage has been returned across the machine to its original position.

15. In a machine of the class described, a movable paper carriage, a member mounted on said carriage to move in one direction but normally held against movement in the other direction, a motor having driving connections with said member for moving the same relative to the carriage, a spring between said member and carriage tensioned by movement of said member and tending to move the carriage in one direction under the control of an escapement mechanism, a switch controlled by said member and carriage adapted to start and stop the motor in accordance with the relative positions of said carriage and member, means for reversing said motor and releasing said member to permit the same to move under the influence of said spring to a position to start said motor whereby the carriage is returned across the machine, and means for automatically reversing said motor after said carriage has been returned across the machine and for latching said member against movement in one direction, said motor, when reversed, acting to move said member in a direction to tension said spring.

16. In a machine of the class described, a movable paper carriage, a spring normally under tension and connected to move said carriage across the machine in one direction under the control of an escapement mechanism, an electric motor having connections for automatically maintaining the effective force of said spring substantially constant as the carriage moves across the machine, means for controlling said motor and its connections to release the tension of said spring and enable the motor to return the carriage across the machine, said motor connections and controlling means acting to cause the motor to automatically retension said spring to the proper amount after the carriage has been returned across the machine.

17. In a machine of the class described, a traveling paper carriage, a spring for urging said carriage in one direction under the control of an escapement mechanism, a tabulating mechanism, an electric motor, driving connections between the motor and carriage, and controlling means which when manipulated disables the escapement mechanism, enables the tabulating mechanism and starts the motor, said motor acting to tension said spring after the carriage is arrested by the tabulating mechanism in the columnar position to which it has been moved.

18. In a machine of the class described, a traveling paper carriage, an escapement mechanism therefor, a member movable relative to said carriage in one direction but normally held against movement in the other, an electric motor for moving said member, means controlled by said carriage and said member and dependent upon the relative position of the two for starting and stopping the motor, and a tabulating mechanism which, when manipulated, releases said escapement mechanism to permit said carriage to be moved by said spring relative to said member to a position to cause the motor to be started, said tabulating mechanism arresting the carriage whereupon said motor moves said movable member relative to the carriage to a position to cause the motor to be stopped.

19. In a machine of the class described, a paper carriage movable across the machine in one direction under the influence of a spring and under the control of an escapement mechanism, a motor having driving connections with a member on said carriage which is movable relative to said carriage to tension said spring, a switch for the motor controlled by the relative position of said carriage and movable member, a tabulating mechanism including tabulating stops and means controlled by a manipulatable member for disabling said escapement mechanism and enabling said tabulating mechanism, said connections also releasing said movable member to permit the same to be moved under the influence of said spring to a position to start said motor, the tabulating mechanism serving to arrest the carriage and said motor then acting to move said member to a position to tension said spring.

20. In a machine of the class described, a paper carriage movable across the machine in one direction under the control of an escapement mechanism and returnable in the opposite direction, a motor having driving connections with said carriage for moving it in both directions, a reversing switch for said motor, a member movable by said motor relative to the carriage, the relative position of said member and carriage serving to control said switch, and a back spacing mechanism which, when operated, disables the escapement mechanism and releases said member for movement one step backwards and moves the carriage manually one step backwards.

21. In a machine of the class described, a paper carriage movable back and forth across the machine, an electric motor having connections with said carriage normally operable to indirectly exert a force on said carriage tending to move it in letter-space direction under control of an escapement mechanism operable by keys, and means for causing said electric motor to directly exert a force on said carriage in the opposite direction to return the carriage across the machine.

22. In a machine of the class described, a paper carriage movable back and forth across the machine, an electric motor having connections with said carriage for indirectly exerting a force on said carriage tending to move it in letter-space direction, an escapement mechanism operable by keys for controlling said letter-space movements of said carriage, and means for reversing said motor and for connecting it directly to said carriage to enable it to return the carriage across the machine.

23. In a machine of the class described, a paper carriage movable back and forth across the machine, spring means for moving said carriage across the machine in letter-space direction under the control of an escapement mechanism operable by keys, an electric motor having connections operable independently of said keys to automatically tension said spring and means for controlling said motor and its connections to cause said motor to return the carriage in the opposite direction across the machine.

24. In a machine of the class described, a paper carriage movable back and forth across the machine, an electric motor having connections with said carriage normally acting to indirectly exert a force on said carriage tending to move it in letter-space direction, an escapement mechanism operable by keys for controlling the letter-space movements of said carriage, and means acting automatically when said carriage reaches a predetermined position in letter-space direction, to cause said electric motor to act directly on said carriage in the opposite direction to return said carriage across the machine.

25. In a machine of the class described, a paper carriage movable back and forth across the machine, an electric motor having connections with said carriage normally acting to indirectly exert a force on said carriage tending to move it in letter-space direction, an escapement mechanism operable by keys for controlling said letter-space movements of said carriage, and means acting automatically, when said carriage reaches a predetermined position in letter-space direction to reverse said motor and connect it directly to said carriage to enable it to return the carriage across the machine.

26. In a machine of the class described, a paper carriage movable back and forth across the machine, spring means for moving said carriage across the machine in letter-space direction under the control of an escapement mechanism operable by keys, an electric motor having connections operable independently of said keys to automatically maintain the tension of said spring uniform as the latter acts to move the carriage in letter-space direction, and means acting automatically, when said carriage reaches a predetermined position in letter-space direction to control the motor and its connections to cause said motor to return the carriage in the opposite direction across the machine.

27. In a machine of the class described, a movable paper carriage, a spring normally tensioned to move said carriage across the machine in one direction under the control of an escapement mechanism, an electric motor having connections for automatically maintaining the effective force of said spring substantially constant as said carriage moves across the machine under the control of said escapement mechanism, means for conditioning said motor and its connections to release the tension of said spring and enable the motor to return the carriage across the machine, and means acting to cause said motor to automatically retension said spring the proper amount in letter spacing direction after said carriage has been returned across the machine.

28. In a machine of the class described, a paper carriage movable back and forth across the machine, a spring for moving the carriage in normal letter-space direction, an escapement mechanism operable by keys for controlling the letter-space movements of said carriage, an electric motor having connections for automatically maintaining the tension of said spring substantially uniform as said spring acts to move the carriage in letter-space direction, means for causing said motor to act directly on said carriage to return it across the machine, and means automatically disconnecting said motor from said carriage and causing said motor to tension said spring in letter-space direction after the carriage has been returned across the machine.

29. In a machine of the class described, a paper carriage movable back and forth across the machine, an escapement mechanism for controlling the carriage movements in letter-space direction, an electric motor having connections for exerting a force on said carriage in letter-space direction, a tabulating mechanism which, when operated, sets up a tabulating stop for arresting the carriage, disables said escapement mechanism and automatically starts said motor, and means acting to automatically stop said motor when said carriage is arrested by said tabulating mechanism.

30. In a machine of the class described, a paper carriage movable across the machine in normal letter-space direction under the control of an escapement mechanism operable by keys, a spring for so moving said carriage, and means controlled by the movement of said carriage for automatically tensioning said spring as said carriage moves across the machine in said normal letter-space direction.

31. In a machine of the class described, a paper carriage movable across the machine in normal letter-space direction under the control of an escapement mechanism operable by keys, a spring for so moving said carriage, and means controlled by the position of said carriage for automatically and intermittently tensioning said spring as the carriage moves across the machine.

32. In a machine of the class described, a paper carriage movable across the machine in normal letter space direction under the control of an escapement mechanism operable by keys, a spring for so moving said carriage, means for restoring tension to said spring, and means operable automatically as the carriage moves across the machine in letter space direction to cause said tension restoring means to operate at a predetermined minimum tension of said spring to maintain the effective force of said spring substantially constant.

33. In a machine of the class described, a paper carriage movable across the machine in normal letter space and return directions, a reversible motor, connections thereto for moving said carriage in one direction, spring means for resiliently urging said carriage in the other direction, and means acting automatically upon operation of said machine to cause said motor to maintain said spring under substantially constant tension at all times as the carriage moves across the machine in letter space direction.

34. In a machine of the class described, a paper carriage movable across the machine in normal letter space direction under the control of an escapement mechanism operable by keys, a spring for so moving said carriage, means for tensioning said spring, means operable automatically as the carriage moves across the machine in letter space direction to cause said tensioning means to maintain the effective force of said spring substantially constant, and means preventing movement of said carriage during tensioning of said spring.

ALLEN A. HORTON.
DWIGHT P. ROWLAND.